(12) United States Patent
Wells, Jr.

(10) Patent No.: US 12,331,808 B2
(45) Date of Patent: Jun. 17, 2025

(54) MULTI-ATTACHMENT LEVER BINDER

(71) Applicant: Columbus McKinnon Corporation, Getzville, NY (US)

(72) Inventor: William P. Wells, Jr., Ider, AL (US)

(73) Assignee: Columbus McKinnon Corporation, Getzville, NY (US)

( * ) Notice: Subject to any disclaimer, the term of this patent is extended or adjusted under 35 U.S.C. 154(b) by 9 days.

(21) Appl. No.: 18/238,982

(22) Filed: Aug. 28, 2023

(65) Prior Publication Data

US 2025/0075772 A1  Mar. 6, 2025

(51) Int. Cl.
*F16G 11/12* (2006.01)
*F16G 15/00* (2006.01)

(52) U.S. Cl.
CPC .............. *F16G 11/12* (2013.01); *F16G 15/00* (2013.01)

(58) Field of Classification Search
CPC ................................ F16G 11/12; F16G 15/00
See application file for complete search history.

(56) References Cited

U.S. PATENT DOCUMENTS

| | | | | |
|---|---|---|---|---|
| 1,911,194 | A | * | 5/1933 | Jenkins .................... F16G 3/006 24/270 |
| 2,564,821 | A | | 1/1947 | Smith |
| 2,821,359 | A | * | 1/1958 | Bushnell ................. F16G 15/04 24/270 |
| 3,233,869 | A | * | 2/1966 | St Pierre ................. F16G 3/006 24/270 |
| 3,418,008 | A | * | 12/1968 | Durbin ................... B60P 7/0838 24/270 |
| 4,366,607 | A | * | 1/1983 | MacCuaig ............. B61D 45/00 24/270 |
| 4,488,707 | A | * | 12/1984 | Mosley ................... F16G 15/00 403/100 |
| 9,810,285 | B2 | | 11/2017 | McNeilly |

* cited by examiner

*Primary Examiner* — David M Upchurch
(74) *Attorney, Agent, or Firm* — PHILLIPS LYTLE LLP

(57) ABSTRACT

A multi-attachment lever binder with a lever having a first and second bifurcated arm mounted thereon. The first bifurcated arm is mounted on the lever to establish a first pivot point. The second bifurcated arm is mounted on the lever to establish a second pivot point. The ends of the first and second bifurcated arms disposed opposite from the pivot points may be joined together to form a cavity for retaining the end of a connection device. The second pivot point is configured to move in an arc centered about the first pivot point as the lever is moved from an open position to a binding position.

19 Claims, 5 Drawing Sheets

MULTI-ATTACHMENT LEVER BINDER

TECHNICAL FIELD

The present invention relates generally to the field of material handling, and more particularly to a mechanical device used to tighten and secure bindings such as a link chain being used to stabilize and secure heavy cargo or equipment on a cargo carrying vehicle or vessel including, but not limited to, trucks, trains, planes, and ships. A lever binder is one type of mechanical device for the above purpose that applies an over-center movement and stores kinetic energy in its handle.

BACKGROUND ART

Lever binders are known and may be used to bring together links of a chain to tighten the chain to bind a load. A lever binder includes a binder body or a yoke with a first hook connected at one end. The binder body is pivotally connected to a lever or handle at a first pivot point. A second hook is connected to a linkage that is pivotally connected to the lever at a second pivot point. The second pivot point is adapted to move in an arc centered about the first pivot point as the lever is moved from an open or extended position to a binding position. What is needed is an improved design for a lever binder.

BRIEF SUMMARY OF THE INVENTION

With parenthetical reference to the corresponding parts, portions or surfaces of the disclosed embodiment, merely for the purposes of illustration and not by way of limitation, the present invention meets the above described need by providing a multi-attachment lever binder (6) with a lever (10) having a first end (11) configured to provide a handle (7) and a second end (12) disposed opposite the first end (11). The lever (10) may have a first pair of trunnions (70, 73) extending from opposite sides of the lever (10) toward the second end (12). The lever (10) also has a second pair of trunnions (76, 79) extending from opposite sides of the lever (10) disposed in spaced apart relation to the first pair of trunnions (70, 73). The first trunnions (70, 73) may be provided with a cylindrical body portion (71, 72) and a cap (74, 75) that has a diameter that is greater than the diameter of the cylindrical body portion (71, 72). The second trunnions (76, 79) may be provided with a cylindrical portion (77, 78) and a cap (80, 81) that has a diameter that is greater than the diameter of the cylindrical body portion (77, 78).

A first bifurcated arm (13) has a first end (19) and a second end (22) disposed opposite from the first end (19). The first bifurcated arm (13) has a pair of arm members (49, 52). Each arm member (49, 52) has an opening (55, 58) at the first end (19) configured to mount on one of the trunnions (70, 73) on the lever (10) to form a first pivot point (25) where the first bifurcated arm (13) attaches to the lever (10). The arm members (49, 52) are configured to attach at the second end (22) to form a cavity (29) configured to receive a stud (61) on a connection device (28, 43). The pair of arm members (49, 52) may coalesce to form a unitary structure in the form of the first bifurcated arm (13). The pair of arm members (49, 52) are curved or have an angle between the first end (19) and the second end (22). The bifurcated arm (13) may be provided with an interlocking feature whereby a tab (14) on one arm member (52) fits into an opening or recess (15) on the opposed arm member (49). A tab (17) may also be provided on arm member (49) to fit into a recess (18) on the opposed arm member (52). In this manner, the arm members (49, 52) may be interlocked for increased strength.

A second bifurcated arm (16) has a first end (34) and a second end (37) disposed opposite from the first end (34). The second bifurcated arm (16) is curved between the first end (34) and the second end (37). The arm (16) has a pair of arm members (82, 85). Each arm member (82, 85) has an opening (93,96) at the first end (34) configured to mount on one of the trunnions (76, 79) on the lever (10) to form a second pivot point (40) where the second bifurcated arm (16) attaches to the lever (10). The arm members (82, 85) are configured to attach at the second end (37) to form a cavity (29) configured to receive stud (61) of a connection device (43). The pair of arm members (82, 85) may coalesce to form a unitary structure in the form of the second bifurcated arm (16). The pair of arm members (82, 85) are curved or have an angle between the first end (34) and the second end (37). The second bifurcated arm (16) may also be provided with interlocks as described above in connection with the first bifurcated arm (13).

The second pivot point (40) is configured to move in an arc centered about the first pivot point (25) as the lever (10) is moved from an open position to a binding position.

DESCRIPTION OF THE PREFERRED EMBODIMENTS

Figure 1:
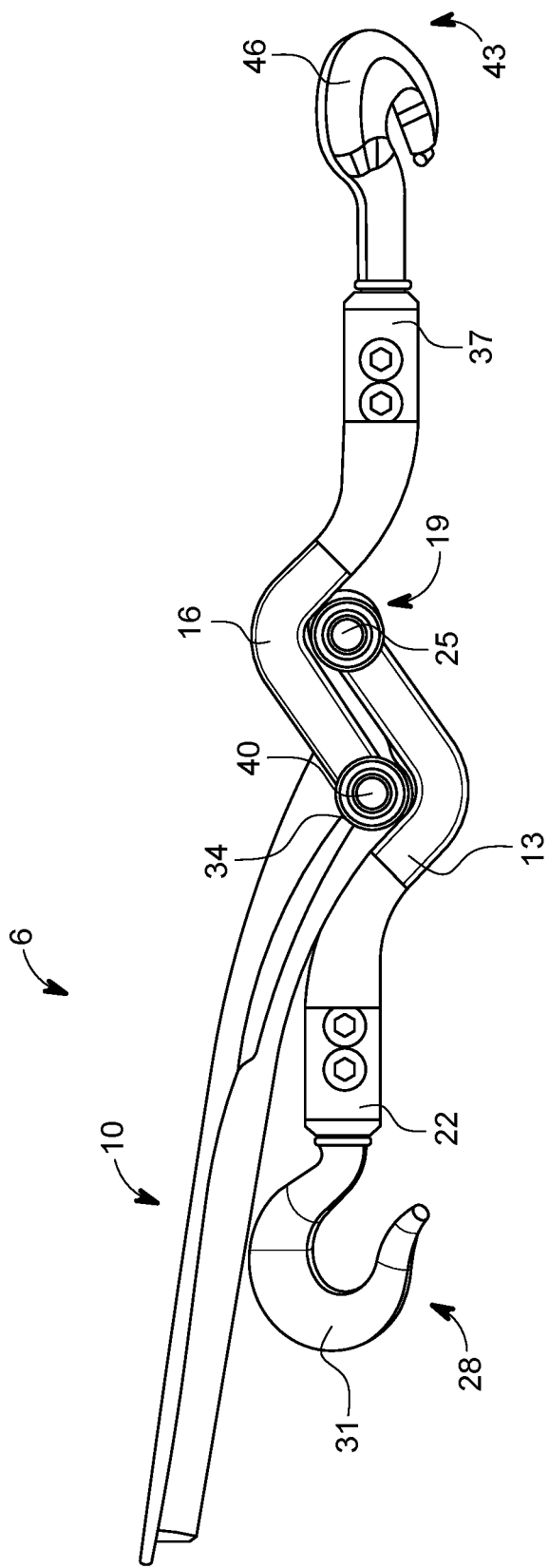
FIG. 1 is a side elevation view of the lever binder of the present invention in the closed/binding position.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, debris, etc.) together with the specification, and are to be considered a portion of the entire written description of this invention. As used in the following description, the terms "horizontal", "vertical", "left", "right", "up" and "down", as well as adjectival and adverbial derivatives thereof, (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or of rotation, as appropriate.

Referring now to FIGS. 1-5 of the drawings generally and initially to FIG. 1, one embodiment of the multi-attachment lever binder 6 of the present invention is shown in the closed or binding position. The multi-attachment lever binder 6 includes a lever 10 having a first bifurcated arm 13 and a second bifurcated arm 16 mounted on the lever 10, as will be described in detail herein. The first bifurcated arm 13 has a first end 19 and a second end 22 disposed opposite therefrom. The first bifurcated arm 13 is curved between the first end 19 and the second end 22. Alternatively, the first bifurcated arm 13 may be angled between the first end 19 and the second end 22. A first pivot point 25 is provided near the first end 19 of the first bifurcated arm 13. The second end 22 is configured to receive a connection device 28 such as a hook 31. Other connection devices such as eyelets, chains, or other devices may also be substituted as described herein and as will be evident to persons of ordinary skill in the art based on this disclosure.

The second bifurcated arm 16 has a first end 34 and a second end 37 disposed opposite from the first end 34. The second bifurcated arm 16 is curved between the first end 34 and the second end 37. Alternatively, the second bifurcated arm 16 may be angled between the first end 34 and the second end 37. A second pivot point 40 is provided near the first end 34 of the second bifurcated arm 16. The second end 37 is configured to receive a connection device 43 which may include a hook 46 or other connection device 43 as described herein.

Figure 2:
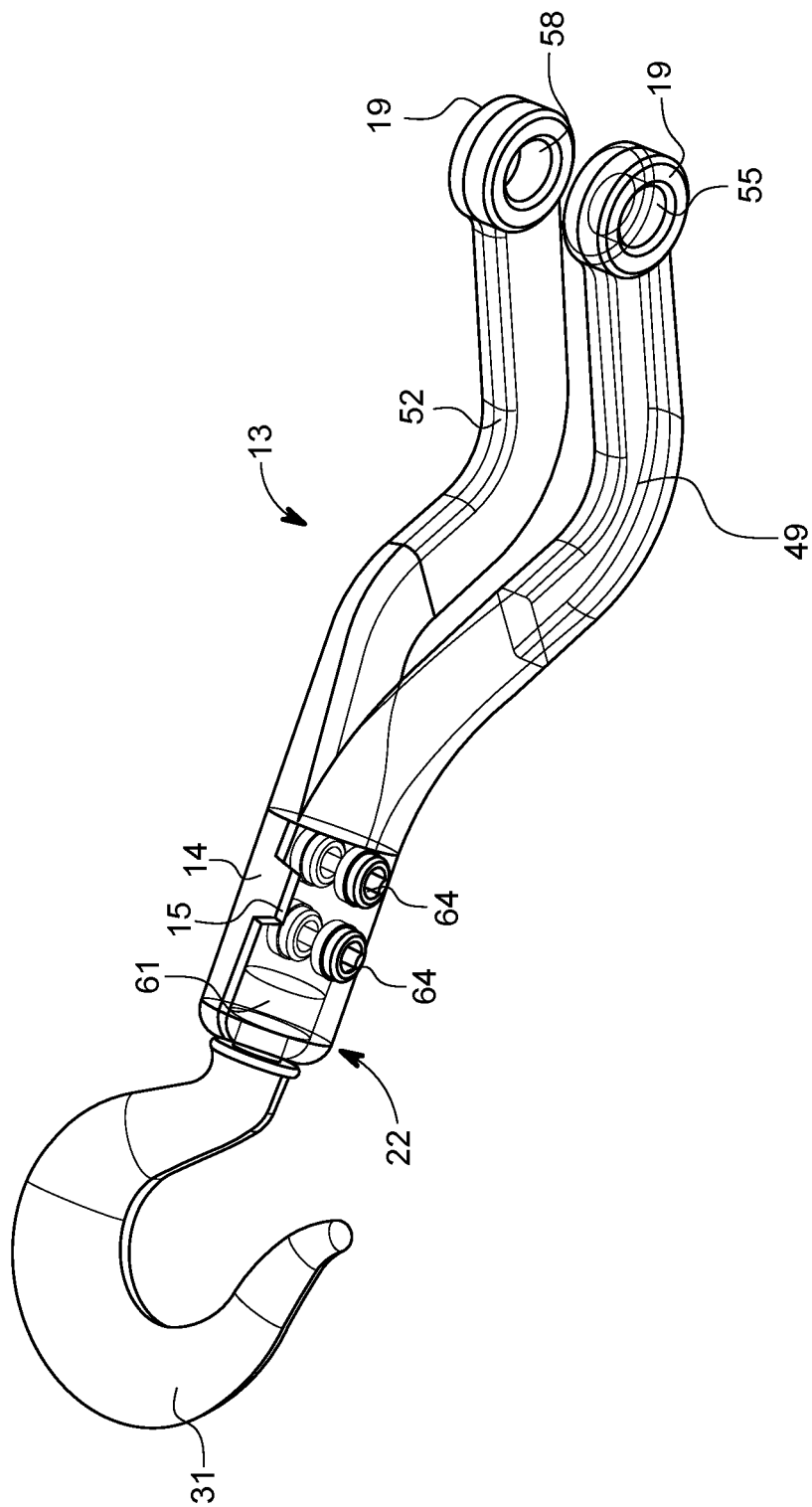
FIG. 2 is a perspective view of one of the bifurcated arms of the lever binder of the present invention.

Turning to FIG. 2, the first bifurcated arm 13 is shown in greater detail. The first bifurcated arm 13 may be comprised of a pair of arm members 49, 52. Each arm member 49, 52 has an opening 55, 58 near the first end 19. The opening 55, 58 is configured to mount on the lever 10 as described below. When mounted on the lever 10 at the first end 19, the arm members 49, 52 are disposed in spaced apart relation on opposite sides of the lever 10.

At the second end 22 of the first bifurcated arm 13, the arm members 49, 52 join together to form a cavity 29 (best shown in FIG. 3) for receiving a stud 61 on the end of the hook 31. The pair of arm members 49, 52 may coalesce to form a unitary structure in the form of the first bifurcated arm 13. The cavity 29 may be configured such that the stud 61 is fixedly attached to the first bifurcated arm 13 when the arms 49 and 52 are joined at end 22 and secured together by fasteners 64. A pair of threaded fasteners 64 may be used to connect the two arm members 49, 52 at the second end 22.

The bifurcated arm 13 may be provided with an interlocking feature whereby a tab 14 on one arm member 52 fits into an opening or recess 15 on the opposed arm member 49. A tab 17 may also be provided on arm member 49 to fit into a recess 18 on the opposed arm member 52. In this manner, the arm members 49, 52 may be interlocked for increased strength and better alignment.

Figure 3:
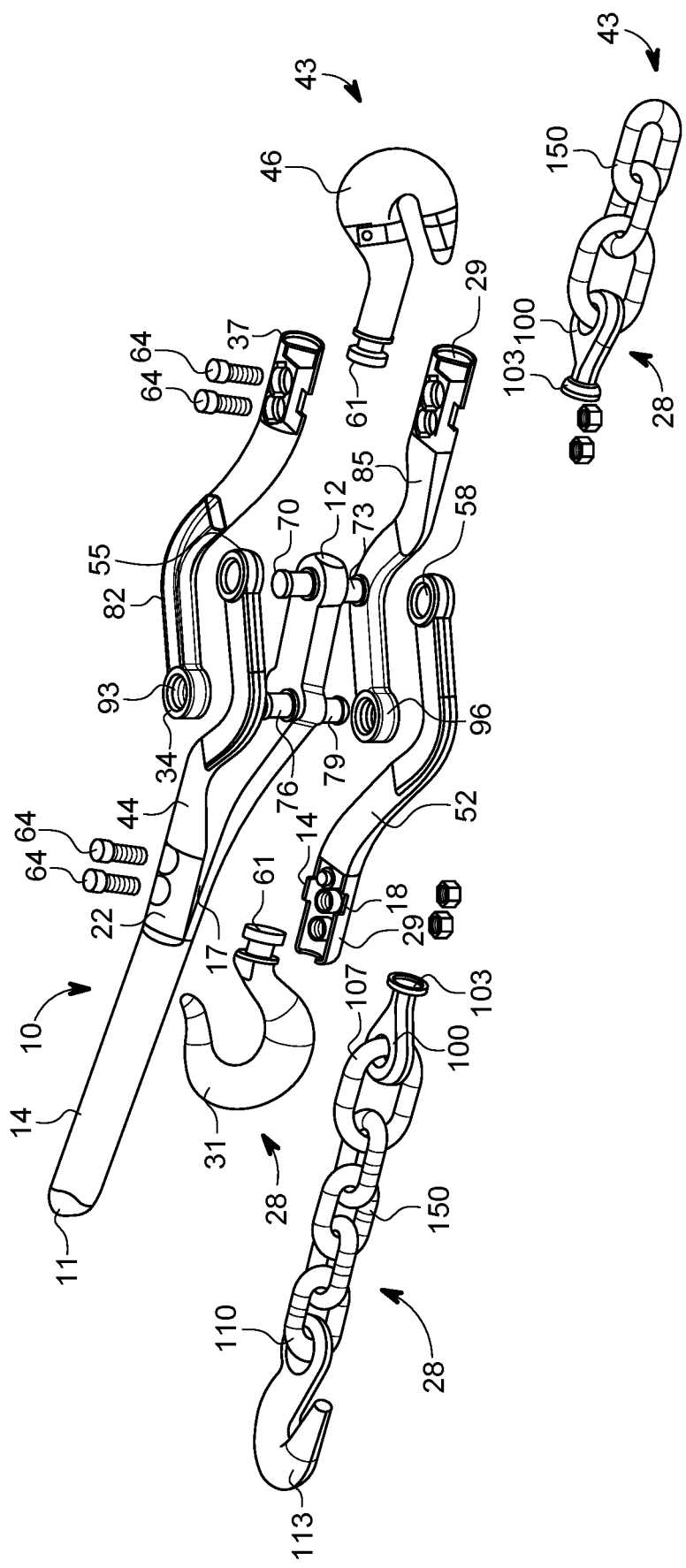
FIG. 3 is an exploded view of the lever binder shown in FIG. 1.
Figure 4:
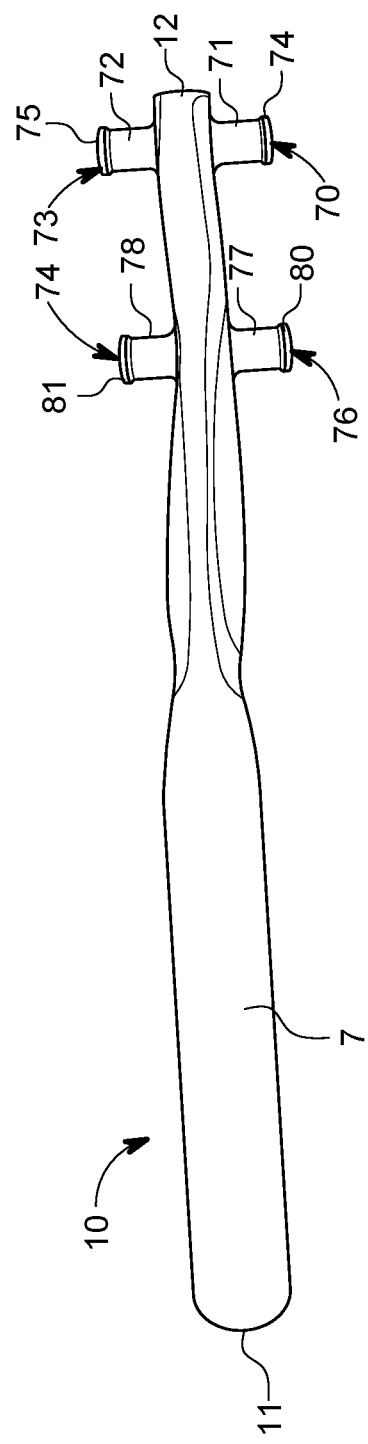
FIG. 4 is a top plan view of the lever.

In FIG. 3, an exploded view of the lever binder 6 shows the lever 10 at the center of the figure. The lever 10 has a first end 11 and a second end 12 disposed opposite from the first end 11. The lever 10 provides a handle 7 that may extend from a midportion of the lever 10 to the first end 11. A pair of trunnions 70 and 73 extend from opposite sides of the lever 10 near the second end 12. The trunnions 70, 73 are configured to be received through the openings 55, 58 in the pair of arms 49, 52 in the first bifurcated arm 13 to establish the first pivot point 25 (FIG. 1). The first trunnions 70, 73 may be provided with a cylindrical body portion 71, 72 and a cap 74, 75 that has a diameter that is greater than the diameter of the cylindrical body portion 71, 72.

A second pair of trunnions 76 and 79 are disposed on the lever 10 in spaced apart relation from the first pair of trunnions 70 and 73. The second pair of trunnions 76 and 79 are configured to be received through the openings 93, 96 in the pair of arms 82, 85 in the second bifurcated arm 16 to establish the pivot point 40 (FIG. 1). The second trunnions 76, 79 may be provided with a cylindrical portion 77, 78 and a cap 80, 81 that has a diameter that is greater than the diameter of the cylindrical body portion 77, 78.

The second bifurcated arm 16 has a pair of arm members 82 and 85. At a first end 34, the arm members 82 and 85 are disposed in spaced apart relation on opposite sides of the lever 10. At the second end 37, the arm members 82 and 85 are joined together by fasteners 64 to form a cavity 29 for receiving the stud 61 on the connection device 46. The second bifurcated arm 16 may also be provided with interlocks as described above in connection with the first bifurcated arm 13. The pair of arm members 82, 85 may also coalesce to form a unitary structure in the form of the second bifurcated arm 16.

As shown, the connection devices 28, 46 may include a direct connection to a hook 31, 46 having a stud 61 extending therefrom. The stud 61 may be provided with a profile configured for being captured inside the cavities 29 formed in the first and second bifurcated arms 13, 16. Alternatively, as shown toward the bottom of the figure, an eyelet 100 may be configured with a stud 103 extending therefrom. The eyelet 100 may be secured in the cavity 29 formed in the first and second bifurcated arms 13, 16. A chain 150 may be attached to the eyelet 100 at a first end 107. The opposite end 110 of the chain 150 may be connected to a hook 113.

Figure 5:
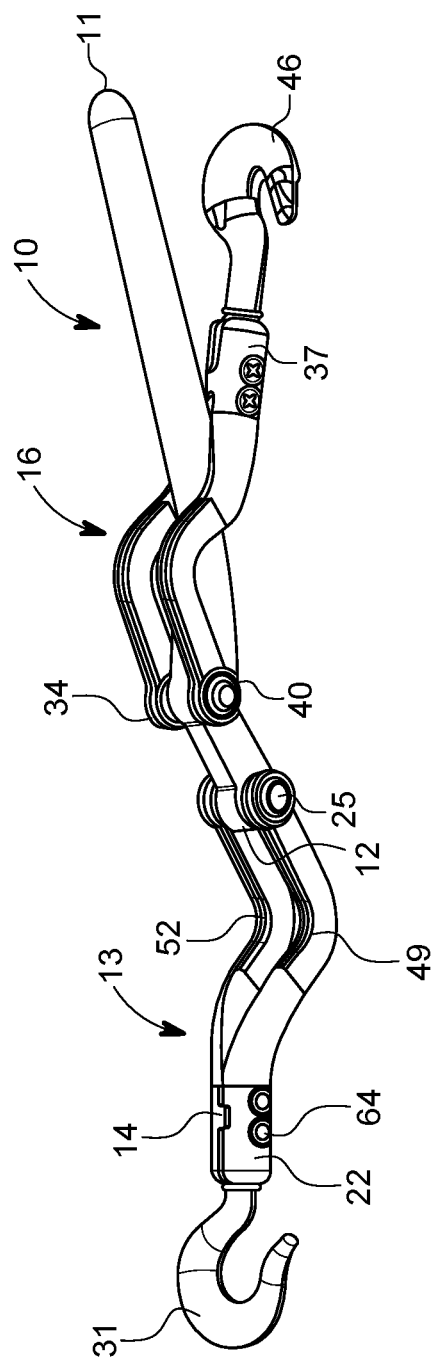
FIG. 5 is a side perspective view of the lever binder shown in the open position.

In use, the lever binder 6, may be placed in the open position shown in FIG. 5. For example, in this position the hooks 31, 46 at the opposite ends 22, 37 may be placed in the chains (not shown) between the load and the tie down on a trailer. Once the lever binder 6 is attached in the open position, the lever 10 may be pulled to the left with respect to FIG. 5. When the lever 10 is pulled to the left, the second pivot point 40 is configured to move in an arc centered about the first pivot point 25 as the lever 10 is moved from the open position of FIG. 5 to the binding position shown in FIG. 1.

The present invention contemplates that many changes and modifications may be made. Therefore, while the presently-preferred form of the multi-attachment lever binder has been shown and described, and several modifications and alternatives discussed, persons skilled in this art will readily appreciate that various additional changes and modifications may be made without departing from the spirit of the invention, as defined and differentiated by the following claims.

What is claimed is:

1. A multi-attachment lever binder, comprising:
   a lever having a first end configured to provide a handle and a second end disposed opposite the first end;
   a first bifurcated arm having a first end and a second end disposed opposite from the first end, the first bifurcated arm having a pair of arm members configured to pivotally mount on the outside of the lever to form a first pivot point between the first bifurcated arm and the lever, the pair of arm members configured to attach to a connection device, the first bifurcated arm curved or angled between the first end and the second end;
   a second bifurcated arm having a first end and a second end disposed opposite from the first end, the arm having a pair of arm members configured to pivotally mount on the outside of the lever to form a second pivot point between the second bifurcated arm and the lever, the pair of arm members configured to attach to a connection device at, the second bifurcated arm curved or angled between the first end and the second end;
   wherein the second pivot point is configured to move in an arc centered about the first pivot point as when the lever is moved from an open position to a binding position; and, wherein the pair of arm members on the first bifurcated arm extend inward toward each other at the second end of the first bifurcated arm and are configured to attach to each other at the second end of the first bifurcated arm to define a unitary structure having a round opening at one end and a cavity defined therein for rotatably receiving at least a portion of the connection device, the cavity having a width greater than the opening such that the at least a portion of the connection device is captured in the cavity and prevented from exiting in the axial direction through the opening.

2. The multi-attachment lever binder of claim 1, wherein the lever has a first pair of trunnions extending from opposite sides of the lever toward the second end and a second pair of trunnions extending from opposite sides of the lever disposed in spaced apart relation to the first pair of trunnions.

3. The multi-attachment lever binder of claim 2, wherein the trunnions further comprise a cylindrical body portion and a cap having a diameter greater than a diameter of the cylindrical body portion.

4. The multi-attachment lever binder of claim 2, wherein each of the pair of arm members on the first bifurcated arm has an opening at the first end configured to mount on one of the first pair of trunnions on the lever to form a first pivot point where the first bifurcated arm attaches to the lever.

5. The multi-attachment lever binder of claim 1, wherein the pair of arm members on the first bifurcated arm coalesce to form the unitary structure.

6. The multi-attachment lever binder of claim 2, wherein each of the pair of arm members on the second bifurcated arm has an opening at the first end configured to mount on one of the second pair of trunnions on the lever to form a second pivot point where the second bifurcated arm attaches to the lever.

7. The multi-attachment lever binder of claim 1, wherein the pair of arm members of the second bifurcated arm curve inward toward each other at the second end and are configured to attach to each other at the second end of the second bifurcated arm to form a cavity configured to receive an end portion of the connection device.

8. The multi-attachment lever binder of claim 1, wherein the connection device attached to the first bifurcated arm comprises is a hook with a stud extending therefrom.

9. The multi-attachment lever binder of claim 1, wherein the connection device attached to the first bifurcated arm comprises is an eyelet connected to a chain.

10. The multi-attachment lever binder of claim 9, wherein the chain has a hook connected thereto.

11. The multi-attachment lever binder of claim 1, wherein the pair of arms members on the first bifurcated arm pivotally mount on opposite sides of the lever.

12. The multi-attachment lever binder of claim 1, wherein the pair of arms members on the second bifurcated arm pivotally mount on opposite sides of the lever.

13. The multi-attachment lever binder of claim 1, wherein the pairs of arm members on the first and second bifurcated arms have cooperating tabs and openings or recesses configured to form an interlock between opposed arm members.

14. A multi-attachment lever binder, comprising:
a lever having a first end configured to provide a handle and a second end disposed opposite the first end, the lever having a first pair of trunnions extending from opposite sides of the lever toward the second end and a second pair of trunnions extending from opposite sides of the lever disposed in spaced apart relation to the first pair of trunnions;
a first bifurcated arm having a first end and a second end disposed opposite from the first end, the first bifurcated arm having a pair of arm members, each arm member having an opening at the first end configured to mount on one of the trunnions on the lever to form a first pivot point where the first bifurcated arm attaches to the lever, the pair of arm members curved or angled between the first end and the second end;
a second bifurcated arm having a first end and a second end disposed opposite from the first end, the arm having a pair of arm members, each arm member having an opening at the first end configured to mount on one of the trunnions on the lever to form a second pivot point where the second bifurcated arm attaches to the lever, the pair of arm members curved or angled between the first end and the second end;
wherein the second pivot point is configured to move in an arc centered about the first pivot point as the lever is moved from an open position to a binding position; and,
wherein the pair of arm members on the first bifurcated arm extend inward toward each other at the second end of the first bifurcated arm and are configured to attach to each other at the second end of the first bifurcated arm to define a unitary structure having a round opening at one end and a cavity defined therein for rotatably receiving at least a portion of the connection device, the cavity having a width greater than the opening such that the at least a portion of the connection device is captured in the cavity and prevented from exiting in the axial direction through the opening.

15. The multi-attachment lever binder of claim 14, wherein the connection device attached to the first bifurcated arm comprises is a hook with a stud extending therefrom.

16. The multi-attachment lever binder of claim 14, wherein the connection device attached to the first bifurcated arm comprises is an eyelet connected to a chain.

17. The multi-attachment lever binder of claim 16, wherein the chain has a hook connected thereto.

18. A multi-attachment lever binder, comprising:
a lever having a first end configured to provide a handle and a second end disposed opposite the first end;
a first bifurcated arm having a first end and a second end disposed opposite from the first end, the first bifurcated arm having a pair of arm members configured to pivotally mount on opposite sides of the lever at the first end to form a first pivot point between the first bifurcated arm and the lever, the pair of arm members curved or angled between the first end and the second end;
a second bifurcated arm having a first end and a second end disposed opposite from the first end, the arm having a pair of arm members configured to pivotally mount on opposite sides of the lever at the first end to form a second pivot point between the second bifurcated arm and the lever, the pair of arm members curved or angled between the first end and the second end;
wherein the second pivot point is configured to move in an arc centered about the first pivot point as the lever is moved from an open position to a binding position; and,
wherein the pair of arm members on the first bifurcated arm extend inward toward each other at the second end of the first bifurcated arm and are configured to attach to each other at the second end of the first bifurcated arm to define a unitary structure having a round opening at one end and a cavity defined therein for rotatably receiving at least a portion of the connection device, the cavity having a width greater than the opening such that the at least a portion of the connection device is captured in the cavity and prevented from exiting in the axial direction through the opening, the cavity configured to interchangeably receive the connection device; and, wherein the pair of arm members on the second bifurcated arm extend inward toward each other at the second end of the second bifurcated arm and are configured to attach to each other at the second end of the second bifurcated arm to define a unitary structure having a round opening at one end and a cavity defined therein for rotatably receiving at least a portion of the connection device, the cavity having a width greater than the opening such that the at least a portion of the connection device is captured in the cavity and prevented from exiting in the axial direction through the opening, the cavity configured to interchangeably receive the connection device;

at least one fastener for attaching the pair of arm members on the first bifurcated arm member together at the second end of the first bifurcated arm member to form the unitary structure.

19. The multi-attachment lever binder of claim 18, wherein the connection device attached to the first bifurcated arm comprises a hook with a stud extending therefrom.

* * * * *